(12) United States Patent
Han et al.

(10) Patent No.: US 12,144,457 B2
(45) Date of Patent: Nov. 19, 2024

(54) COOKING UTENSIL HAVING MULTI-STRUCTURED COMPOSITE BASES

(71) Applicants: Sang Hyuk Han, Yongin-si (KR); Eun Ju Jang, Yongin-si (KR)

(72) Inventors: Sang Hyuk Han, Yongin-si (KR); Eun Ju Jang, Yongin-si (KR)

( * ) Notice: Subject to any disclaimer, the term of this patent is extended or adjusted under 35 U.S.C. 154(b) by 596 days.

(21) Appl. No.: 17/425,557

(22) PCT Filed: May 21, 2019

(86) PCT No.: PCT/KR2019/006070
§ 371 (c)(1),
(2) Date: Jul. 23, 2021

(87) PCT Pub. No.: WO2020/153539
PCT Pub. Date: Jul. 30, 2020

(65) Prior Publication Data
US 2022/0087470 A1 Mar. 24, 2022

(30) Foreign Application Priority Data
Jan. 23, 2019 (KR) .......................... 10-2019-0008719

(51) Int. Cl.
*A47J 36/02* (2006.01)
*A47J 27/00* (2006.01)
*A47J 36/06* (2006.01)

(52) U.S. Cl.
CPC .............. *A47J 36/02* (2013.01); *A47J 27/002* (2013.01); *A47J 36/06* (2013.01)

(58) Field of Classification Search
CPC .......... A47J 36/02; A47J 27/002; A47J 36/06; A47J 27/122; A47J 36/16; A47J 36/04; A47J 41/0044; B32B 15/01; B32B 15/012; A21B 3/137; Y10S 220/912; B65D 1/36

USPC ................. 220/573, 557; 99/339, 413, 422; 126/390.1
See application file for complete search history.

(56) References Cited

U.S. PATENT DOCUMENTS

2012/0031918 A1 * 2/2012 Gotsis .................. A47J 27/002
                                                      220/752

FOREIGN PATENT DOCUMENTS

| EP | 0427945 A2 * | 2/1990 | |
| EP | 0836823 A1 * | 4/1998 | .............. A47J 27/00 |
| JP | 09-215604 A | 8/1997 | |

(Continued)

OTHER PUBLICATIONS

International Search Report and Written Opinion mailed Oct. 23, 2019 in International Application No. PCT/KR2019/006070, in 10 pages. (English translation of ISR in 2 pages.).

(Continued)

*Primary Examiner* — Don M Anderson
*Assistant Examiner* — John Martin Hoppmann
(74) *Attorney, Agent, or Firm* — Knobbe, Martens, Olson, & Bear, LLP (57) ABSTRACT

Provided is a cooking utensil for cooking by variously combining multi-structured composite bases according to a user's selection. The cooking utensil includes: a base portion made of a composite material and formed to have different thermal conductivities of a heat source according to cooking ingredients and cooking methods; a body portion into which the cooking ingredients are put and to which the base portion is detachably coupled; and a lid configured to seal an upper part of the body portion.

8 Claims, 7 Drawing Sheets

(56) References Cited

FOREIGN PATENT DOCUMENTS

| | | | |
|---|---|---|---|
| JP | 2001-017311 | A | 1/2001 |
| JP | 2012-519560 | A | 8/2012 |
| KR | 10-2004-0110915 | A | 12/2004 |
| KR | 20-0438581 | Y1 | 2/2008 |
| KR | 10-0827341 | B1 | 5/2008 |
| KR | 20-0464111 | Y1 | 12/2012 |
| KR | 10-1619852 | B1 | 5/2016 |
| KR | 10-2016-0099177 | A | 8/2016 |
| WO | WO 97/28726 | A1 | 8/1997 |
| WO | WO 2011/076055 | A1 | 6/2011 |

OTHER PUBLICATIONS

Office Action dated Dec. 22, 2019 in Korean Application No. 10-2019-0008719, in 4 pages.
Notice of Allowance dated Jul. 9, 2020 in Korean Application No. 10-2019-0008719, in 3 pages.

* cited by examiner

COOKING UTENSIL HAVING MULTI-STRUCTURED COMPOSITE BASES

TECHNICAL FIELD

The present disclosure relates to a cooking utensil having multi-structured composite bases. More particularly, the present disclosure relates to a cooking utensil having multi-structured composite bases which may allow a user to directly combine and use bases for providing various thermal conductivities according to cooking methods and effectively transferring heat of a heat source to cooking ingredients, thereby efficiently cooking desired food and maximizing the taste and flavor of food.

BACKGROUND ART

In general, from among cooking utensils, a pot is cookware used to boil food or to cook in various ways such as steaming, stir-frying, roasting, and frying according to ingredients, and includes a pot body having a certain depth suitable for putting and cooking the ingredients therein, a lid covering an opening portion of the pot body, and a handle connected to the pot body.

However, in the case of general pots, because different thermal conductivities should be provided according to cooking methods, different types of pots should be used according to cooking methods to be used or the characteristics of ingredients.

Korean Utility Model Registration No. 20-0464111 discloses a cooking pot divided into first and second pot bodies.

However, the cooking pot of the prior art has a problem in that because one pot is simply divided into two pot bodies, heat of a heat source may not be effectively transferred according to the characteristics of ingredients. That is, the pot as a cooking utensil does not provide different thermal conductivities according to various cooking methods.

Molecular gastronomy refers to a series of activities that develop a new taste and texture by scientifically analyzing the texture, structure, and cooking process of food. Molecular gastronomy aims to investigate physical and chemical changes during a cooking process, and includes scientific, artistic, and technical aspects.

That is, molecular gastronomy is a scientific discipline that studies and analyzes the structure and texture of cooking ingredients, a cooking process, and know-how to create new 'food compatibility' and new taste that has never existed before, and involves and oversees the three concepts of cooking, food science, and science of cooking.

In order to cook through molecular gastronomy, cooking utensils such as a vacuum pot for cooking disclosed in Korean Utility Model Registration No. 20-0438581 have been developed and sold.

However, in molecular gastronomy, it is very important not only to simply cook in a vacuum state but also to provide thermal conductivities according to the characteristics of cooking ingredients in order to keep the cooking ingredients at a constant desired temperature. However, the development of cooking utensils for keeping cooking ingredients at a constant desired temperature is insufficient.

PRIOR ART DOCUMENTS

Patent Documents (Patent Document 1) Korean Utility Model Registration No. 20-0464111

(Patent Document 2) Korean Utility Model Registration No. 20-0438581

DESCRIPTION OF EMBODIMENTS

Technical Problem

In order to solve the problems described in the background art, an objective of the present disclosure is to provide a cooking utensil having multi-structured composite bases which may allow a user to directly combine and use bases for providing various thermal conductivities according to cooking methods such as boiling cooking ingredients as well as steaming, stir-frying, roasting, and fraying to more efficiently cook desired food, and may allow cooking to be performed by providing a thermal conductivity suitable for cooking ingredients even without using a cooking utensil of another material to maximize the taste and flavor of food.

Also, another objective of the present disclosure is to provide a cooking utensil having multi-structured composite bases which may allow bases made of a metal material and a natural material and capable of providing various thermal conductivities to be easily and conveniently replaced to preserve the unique taste of food without being limited to a specific heat source method.

However, the objectives of the present disclosure are not limited thereto, and other objectives or effects may become apparent to one of ordinary skill in the art based on the following descriptions.

Solution to Problem

According to an embodiment of the present disclosure for solving the problems, a cooking utensil for cooking by combining multi-structured composite bases includes a base portion made of a composite material and formed to have different thermal conductivities of a heat source according to cooking ingredients and cooking methods; a body portion into which the cooking ingredients are put and to which the base portion is detachably coupled; and a lid configured to seal an upper part of the body portion.

According to an embodiment of the present disclosure, the composite material may include any one of a metal material, a mineral material, and Himalayan crystal salt, or a combination thereof.

According to an embodiment of the present disclosure, the metal material may have a multi-layer structure in which stainless and aluminum are stacked.

According to an embodiment of the present disclosure, when the composite material includes charcoal, the base portion may include a charcoal cover in which the charcoal is contained.

According to an embodiment of the present disclosure, the base portion may be made of a combination of one or more composite materials according to a user's selection.

According to an embodiment of the present disclosure, the base portion may further include a coupling frame to which the one or more composite materials are detachably coupled.

According to an embodiment of the present disclosure, the base portion may include a heat source provider configured to form a bottom surface and transfer heat of a heat source, and coupling flanges located on both sides of the heat source provider and detachably coupled to the body portion.

According to an embodiment of the present disclosure, the base portion may further include a frame portion to which the one or more composite materials are detachably coupled.

According to an embodiment of the present disclosure, the body portion may include an upper flange to which the lid is coupled, a bottom portion configured to form a bottom surface of the body portion, and a coupling portion that extends downward to a lower circumferential surface of the bottom portion and to which an outer circumferential surface or an inner circumferential surface of the base portion is coupled, wherein the cooking utensil further includes a heat source provider configured to form the bottom surface of the body portion and transfer heat of a heat source to the base portion.

According to an embodiment of the present disclosure, a plurality of body portions may be sequentially stacked on the upper flange.

Advantageous Effects of Disclosure

According to an embodiment of the present disclosure, because a user directly combines and uses bases for providing various thermal conductivities according to cooking methods such as boiling cooking ingredients as well as steaming, stir-frying, roasting, and frying, desired food may be more efficiently cooked.

Also, according to an embodiment of the present disclosure, because cooking is performed by providing a thermal conductivity suitable for cooking ingredients even without using a cooking utensil of another material, the taste and flavor of food may be maximized.

Also, according to an embodiment of the present disclosure, because bases made of a metal material and a natural material and capable of providing various thermal conductivities may be easily and conveniently replaced, the unique taste of food may be preserved without being limited to a specific heat source method.

In addition, various and beneficial advantages and effects of the present disclosure are not limited thereto, and will be more easily understood while specific embodiments of the present disclosure are described.

EXPLANATION OF REFERENCE NUMERALS DESIGNATING THE MAJOR ELEMENTS OF THE DRAWINGS

| 100: base portion | 110: coupling flange | 120: frame portion |
|---|---|---|
| 130: division panel | 200: body portion | |
| 210: upper flange | 220: coupling portion | |
| 230: receiving portion | 300: heat source provider | |

BEST MODE

Hereinafter, embodiments of the present disclosure will be described in detail with reference to the accompanying drawings. In the following description, the same drawing reference numerals are used for the same elements even in different drawings. Also, while describing the present disclosure, detailed descriptions of related well-known functions or configurations that may blur the points of the present disclosure are omitted.

Also, while describing elements of the present disclosure, terms such as first, second, A, B, (a), and (c) may be used. These terms are intended to distinguish one element from another element, and only the essence, order, or sequence of the element is not limited thereto. It will be understood that when an element is referred to as being "connected", "coupled", or "accessed" to or by another element, the element may be directly connected, coupled, or accessed to or by the other element or intervening elements may be present.

Figure 1:
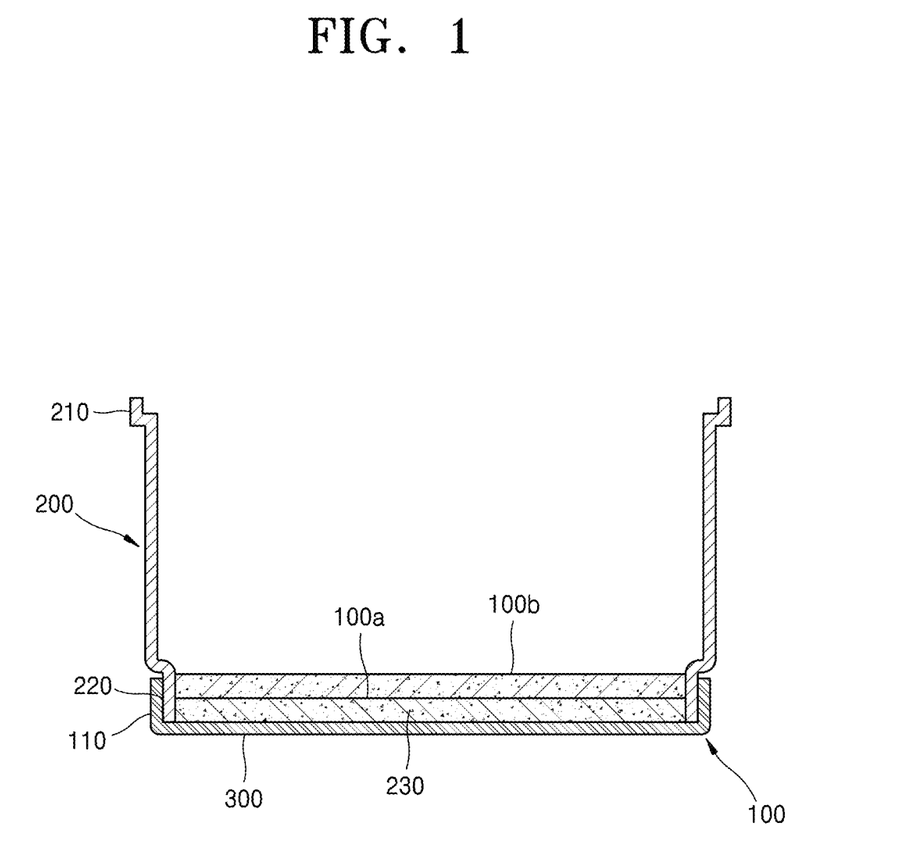
FIG. 1 is a view illustrating a cooking utensil having multi-structured composite bases, according to an embodiment of the present disclosure.
Figure 2:
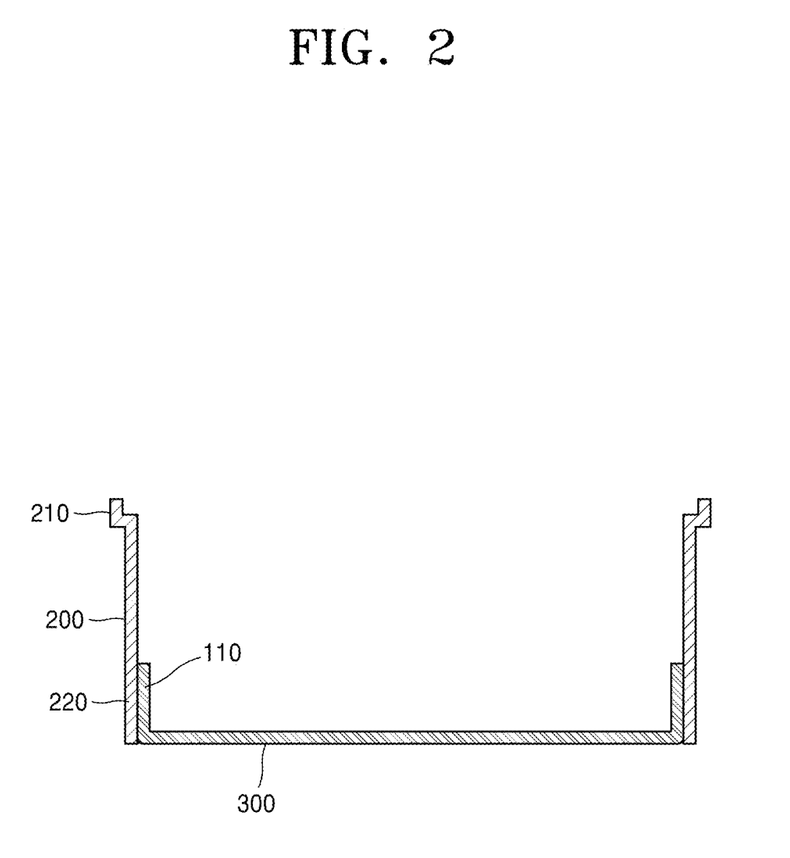
FIGS. 2 and 3 are views each illustrating a base portion of a cooking utensil having multi-structured composite bases, according to other embodiments of the present disclosure.
Figure 3:
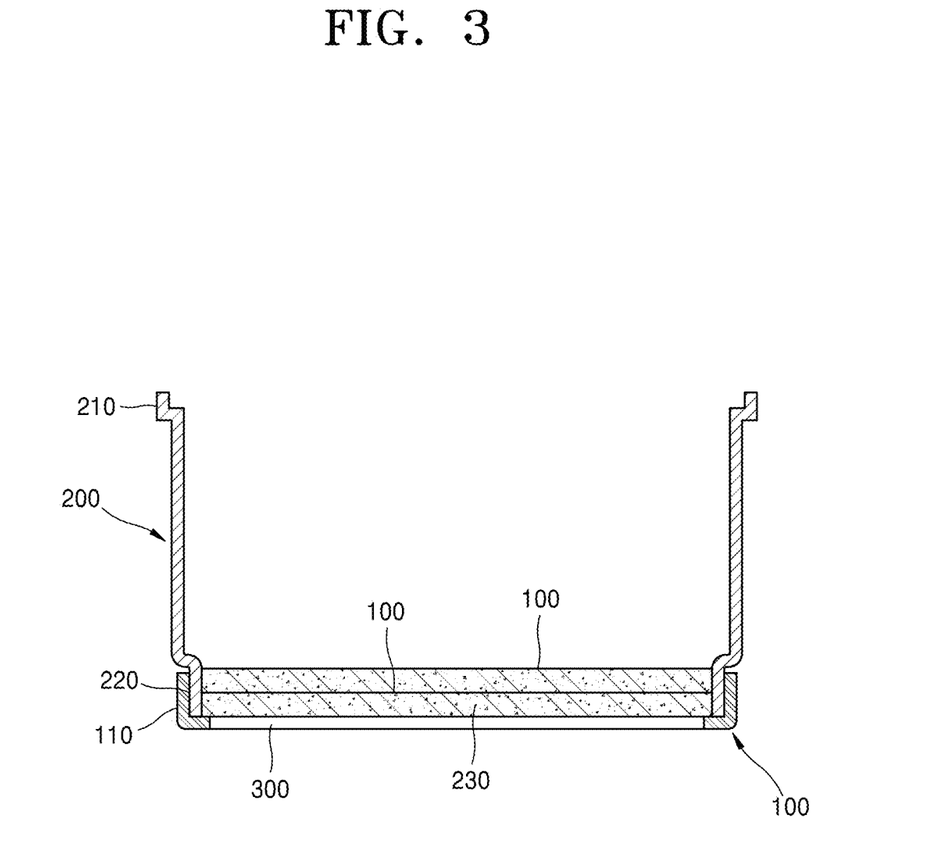
Figure 4:
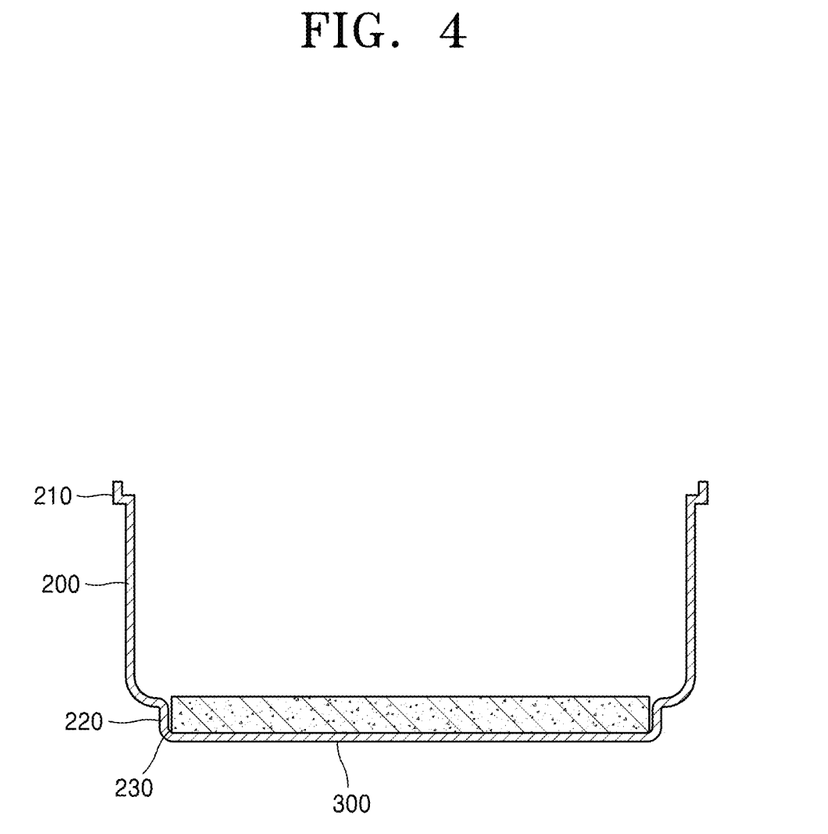
FIG. 4 is a view illustrating a body portion of a cooking utensil having multi-structured composite bases, according to another embodiment of the present disclosure.
Figure 5:
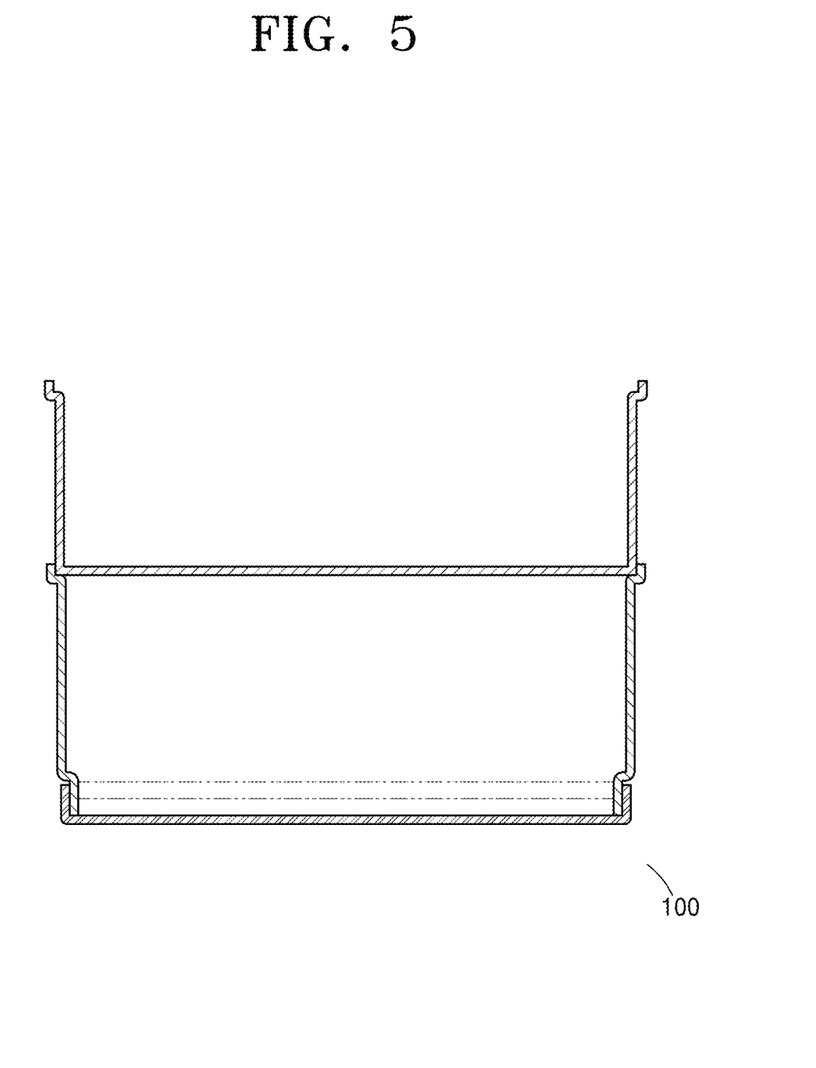
FIGS. 5 and 6 are views illustrating an upper stacked structure of a cooking utensil having multi-structured composite bases, according to other embodiments of the present disclosure.
Figure 6:
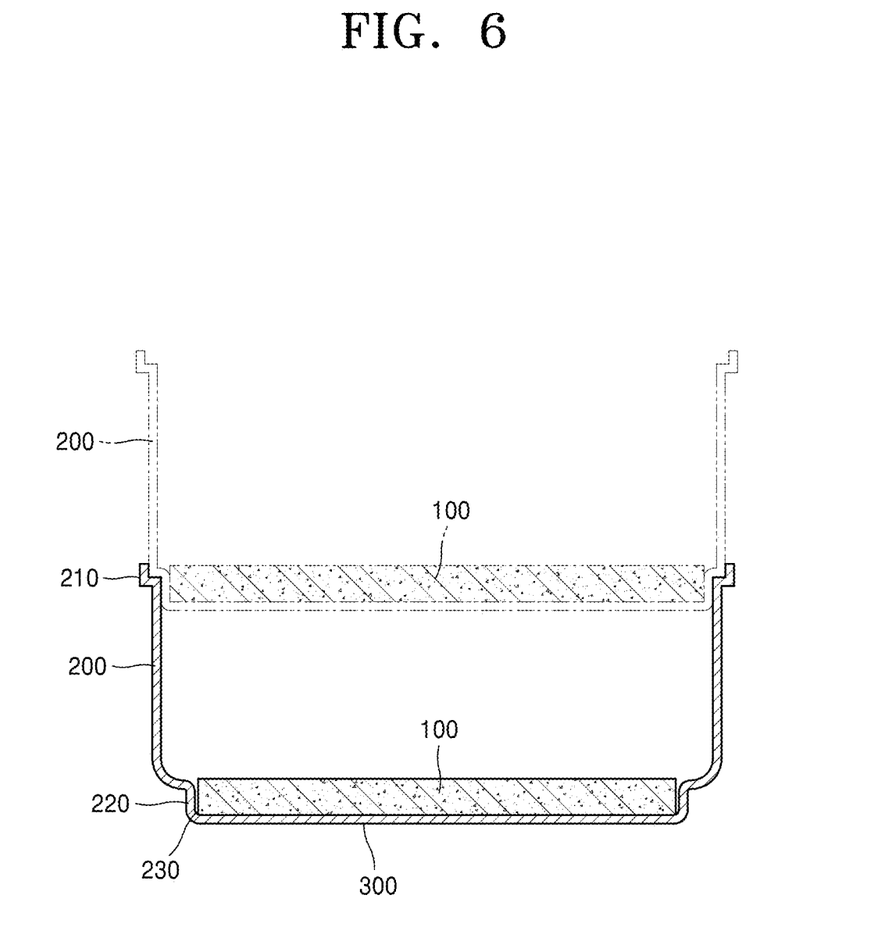
Figure 7:
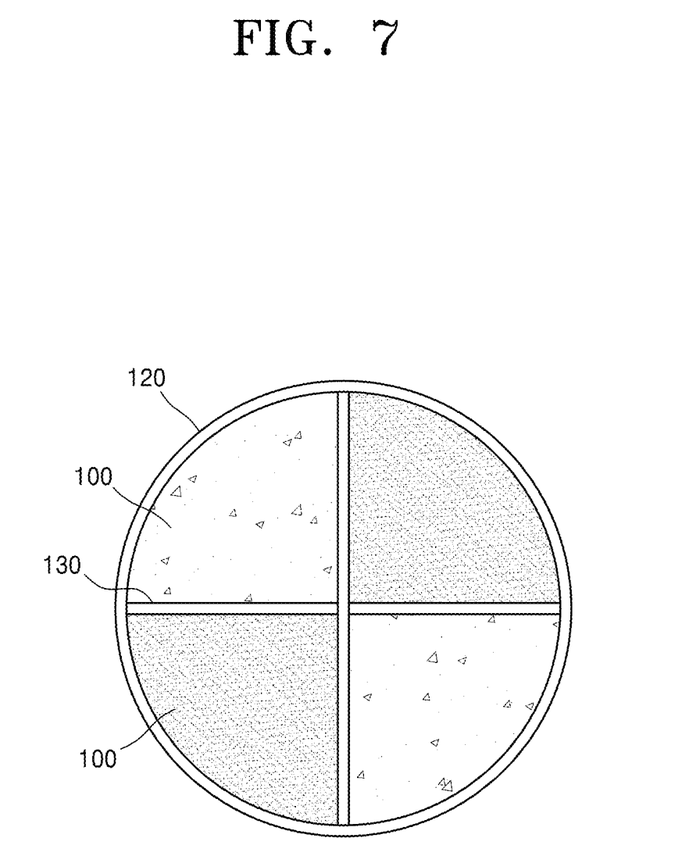
FIG. 7 is a view illustrating a base portion of a cooking utensil having multi-structured composite bases, according to another embodiment of the present disclosure.

FIG. 1 is a view illustrating a cooking utensil having multi-structured composite bases, according to an embodiment of the present disclosure. FIGS. 2 through 4 are views each illustrating a base portion and a body portion of a cooking utensil having multi-structured composite bases, according to other embodiments of the present disclosure. FIGS. 5 and 6 are views illustrating an upper stacked structure of a cooking utensil having multi-structured composite bases, according to other embodiments of the present disclosure. FIG. 7 is a view illustrating a base portion of a cooking utensil having multi-structured composite bases, according to another embodiment of the present disclosure.

The present disclosure provides a cooking utensil for performing cooking according to the characteristics of cooking ingredients by combining multi-structured composite bases and effectively providing thermal conductivities suitable for cooking methods such as boiling food ingredients as well as steaming, stir-frying, roasting, and frying, and the cooking utensil includes a base portion 100 made of various materials and configured to transfer heat of a heat source to the cooking ingredients and a body portion 200 into which the cooking ingredients are put and to which the base portion 100 is detachably coupled.

The base portion 100 is seated on a bottom surface of the body portion 200 or detachably coupled to the body portion 200, is used in combination with the body portion 200 according to kinds of food and cooking methods, and contacts a heat source and is configured to heat to a certain temperature, and a heat source provider 300 is formed on a bottom surface to directly heat cooking ingredients according to the cooking ingredients or transfer heat of the heat source into the body portion 200.

The base portion 100 may be made of a composite material such as a metal material, a mineral material, charcoal, or Himalayan crystal salt to provide different thermal conductivities according to kinds of food and intensities of the heat source.

In this case, when the base portion 100 is made of a metal material, the base portion may be made of stainless steel alone. However, the present disclosure is not limited thereto, and the base portion 100 may be include a mixed metal in which stainless steel and aluminum or copper are mixed or stacked at a certain ratio.

That is, when the base portion 100 is made of a metal material, the base portion 100 may have a multi-layer structure in which stainless steel and aluminum or copper are stacked, and preferably, the base portion 100 may be formed so that an upper layer and a lower layer of the base portion 100 are stainless steel layers and a central layer is at least one of an aluminum layer or a copper layer.

In this case, the aluminum layer may have, but is not limited to, a structure in which aluminum 1050 and aluminum 3003 are stacked.

Also, the base portion 100 may be made of a mineral material such as various stones or a natural material such as Himalayan crystal salt in order to provide various thermal conductivities according to the characteristics of cooking ingredients, when cooking is performed based on molecular gastronomy.

In this case, when the base portion 100 is made of a mineral material or Himalayan crystal salt, the base portion 100 directly contacts the heat source and is configured to transfer heat of the heat source.

Accordingly, the taste and flavor of food may be further maximized due to beneficial effects provided from the mineral material and the natural material such as Himalayan crystal salt to various cooking ingredients located on a top surface of the base portion 100.

For example, when the base portion 100 of the present disclosure is made of Himalayan crystal salt, salt of the Himalayan crystal salt is included in food, thereby improving the taste and flavor of the food.

However, the present disclosure is not limited thereto, and the base portion of the present disclosure may be formed so that the natural material such as Himalayan crystal salt is coated on a surface of the metal material or stone.

Accordingly, because the cooking utensil of the present disclosure performs cooking by applying heat to cooking ingredients through the base portion 100 according to the cooking ingredients or cooking methods, to provide various thermal conductivities according to the cooking ingredients, the taste and flavor of food may be maximized.

Because the base portion 100 is closely coupled to the body portion 200 to prevent leakage of moisture occurring during cooking, various cooking such as boiling, frying, and steaming as well as roasting is possible.

Also, the base portion 100 of the present disclosure may be made of a material such as charcoal. In this case, when the base portion 100 is made of charcoal, it is preferable that the base portion 100 further includes a charcoal cover in which the charcoal is contained. However, the present disclosure is not limited thereto, the base portion 100 may be formed in various ways to include the charcoal alone or to include the charcoal cover in which the charcoal is contained according to a shape of the heat source provider 300 of the body portion 200 as described below.

The base portion 100 of the present disclosure is formed so that the heat source provider 300 forms a bottom surface to efficiently transfer heat of the heat source.

Also, coupling flanges 110 bent upward from both end portions of the heat source provider 300 and detachably coupled to the body portion 200 are located on both sides of the base portion 100.

In this case, outer circumferential surfaces or inner circumferential surfaces of the coupling flanges 110 may be coupled to a coupling portion 220 of the body portion 200 by using a screw fastening method as shown in FIGS. 1 and 2. However, the present disclosure is not limited thereto, and the outer or inner circumferential surfaces of the coupling flanges 110 may be coupled in any of various methods such as a fitting method or a detachable coupling method as long as leakage of a liquid such as moisture or water from cooking ingredients is prevented.

Other base portions 100a and 100b made of either a mineral material, charcoal, or Himalayan crystal salt may be stacked on the base portion 100.

That is, the base portion 100 including the coupling flanges 110 formed on both end portions to be detachably coupled to the body portion 200 may be made of a composite material including a metal material, and the other base portions 100a and 100b stacked on the base portion 100 made of the metal material may be made of either a mineral material, charcoal, or Himalayan salt and only the heat source provider 300 may be formed on a bottom surface.

However, the present disclosure is not limited thereto, and the other base portions 100a and 100b may also be made of a composite material including a metal material.

Although the heat source provider 300 is formed on a bottom surface of the base portion 100, the present disclosure is not limited thereto, and as shown in FIG. 3, the heat source provider 300 passes through the bottom surface of the base portion 100 by a certain area so that the other base portions 100a and 100b and heat of the heat source directly contact each other to transfer heat.

The base portion 100 of the present disclosure may be made of a combination of multiple materials according to a user's selection.

For example, as shown in FIG. 6, a frame portion 120 to which the base portion 100 made of any one of a metal material, stone, charcoal, and a salt is coupled may be further provided, and the frame portion 120 is formed so that a bottom surface is detachably coupled to the coupling portion 220 included in the body portion 200 as described below, or is formed to be coupled to the coupling flanges 110 of the base portion 100.

A division panel 130 dividing an inner space of the frame portion 120 is further provided so that a plurality of base portions 100 made of different materials are detachably coupled.

Although the division panel 130 dividing the inner space into two or more spaces has a cross shape to have the same area around the center of the frame portion 120, the present disclosure is not limited thereto. A plurality of division panels 130 may be spaced apart from one another by a certain interval in the inner space of the frame portion 120 to have a diameter decreasing toward the center of the frame portion 120.

The cooking utensil of the present disclosure constructed as described above may have any of various shapes according to a design so that assembly and disassembly are possible according to outer shapes of the base portion 100 and the body portion 200, and may have a polygonal shape such as an elliptical shape, a quadrangular shape, or an octagonal shape as well as a circular shape.

The body portion 200 may include an open upper portion or may include a through-inner portion into which cooking ingredients are put, and the base portion 100 may be coupled to a lower portion of the body portion 200 so that heat of the heat source is transferred to cooking ingredients to perform cooking.

The body portion 200 includes an upper flange 210 that is formed on an open upper end portion of the body portion 200 and on which a lid or the like is seated to seal an inner space of the body portion 200 during cooking.

In this case, the upper flange 210 is bent and forms a certain stepped portion so that the lid is seated.

Also, not only the lid but also a plurality of body portions 200 are stacked on the upper flange.

When the plurality of body portions 200 are stacked, more various dishes may be made.

That is, when a lower body portion 200 from among the plurality of body portions 200 is coupled to the base portion 100 made of charcoal or the like and thus smoke generated while the charcoal is heated by heat of the heat source passes through an upper body portion 200, cooking using fumigation may be performed, or when content such as water is stored and heated inside a lower body portion 200, cooking using steam may be performed.

Also, the body portion 200 includes the coupling portion 220 that extends downward to a lower circumferential surface and to which the base portion 100 is detachably coupled.

The coupling portion 220 is formed so that an outer circumferential surface or an inner circumferential surface of the base portion 100 is closely attached or is coupled.

That is, the coupling portion 220 functions as a coupling medium for coupling the body portion 200 to the base portion 100.

The coupling portion 220 may be bent at a lower end portion to form a bottom surface of the body portion 200, and may further include the heat source provider 300 that transfers heat of the heat source to the base portion 100, as shown in FIG. 3.

In this case, a receiving portion 230 in which the base portions 100, 100a, and 100b are received and coupled to an upper portion of the heat source provider 300 is formed in the body portion 200.

The heat source provider 300 provided in the body portion 200 may include a panel integrally formed with the coupling portion 220 to seal a lower end portion of the body portion 200. Accordingly, content may be prevented from leaking when performing soup cooking or frying.

It will be further understood that the terms "comprising", "including", or "having" used herein specify the presence of stated components unless otherwise described, and do not preclude the presence or addition of one or more other components. The terms including technical or scientific terms used herein have the same meaning as commonly understood by one of ordinary skill in the art to which the disclosure pertains unless otherwise defined.

While this present disclosure has been particularly shown and described with reference to embodiments thereof, it will be understood by one of ordinary skill in the art that various changes in form and details may be made therein without departing from the spirit and scope of the present disclosure as defined by the appended claims. Accordingly, the embodiments of the present disclosure should be considered in descriptive sense only and not for purposes of limitation of the scope of the present disclosure. Therefore, the scope of the present disclosure is defined not by the detailed description of the present disclosure but by the appended claims, and all differences within the scope will be construed as being included in the present disclosure.

The invention claimed is:

1. A cooking utensil having multi-structured composite bases and configured to be used for cooking by combining the multi-structured composite bases, the cooking utensil comprising:
   a base portion including a composite material and formed to have different thermal conductivities according to cooking ingredients and cooking methods;
   a body portion into which the cooking ingredients are put and to which the base portion is detachably coupled; and
   a lid configured to seal an upper part of the body portion,
   wherein the base portion further comprises a frame portion, and
   wherein the frame portion comprises a division panel dividing an inner space of the frame portion.

2. The cooking utensil of claim 1, wherein the composite material comprises any one of a metal material, a mineral material, and Himalayan crystal salt, or a combination thereof.

3. The cooking utensil of claim 2, wherein the metal material has a multi-layer structure in which stainless and aluminum are stacked.

4. The cooking utensil of claim 2, wherein, when the composite material comprises charcoal, the base portion comprises a charcoal cover in which the charcoal is contained.

5. The cooking utensil of claim 1, wherein the base portion comprises
   a heat source provider configured to form a bottom surface and transfer heat of a heat source, and
   coupling flanges located on both sides of the heat source provider and detachably coupled to the body portion.

6. The cooking utensil of claim 1, wherein the composite material is detachably coupled to the frame portion.

7. The cooking utensil of claim 1, wherein the body portion comprises
   an upper flange to which the lid is coupled,
   a bottom portion configured to form a bottom surface of the body portion, and
   a coupling portion that extends downward to a lower circumferential surface of the bottom portion and to which an outer circumferential surface or an inner circumferential surface of the base portion is coupled,
   wherein the cooking utensil further comprises a heat source provider configured to form the bottom surface of the body portion and transfer heat of a heat source to the base portion.

8. The cooking utensil of claim 7, wherein a plurality of body portions are sequentially stacked on the upper flange.

* * * * *